United States Patent

[11] 3,620,628

[72] Inventors Kazuo Yasuda;
 Koichi Uchino; Koji Nishiwaki; Hiroshi Inomata, all of Katsuta-shi, Japan
[21] Appl. No. 820,434
[22] Filed Apr. 30, 1969
[45] Patented Nov. 16, 1971
[73] Assignee Hitachi, Ltd.
 Tokyo, Japan
[32] Priority May 4, 1968
[33] Japan
[31] 43/29545

[54] PHOTOELECTRIC SAMPLE MEASURING APPARATUS
 5 Claims, 4 Drawing Figs.
[52] U.S. Cl. .................................................. 356/87, 250/43.5, 250/218
[51] Int. Cl. .................................................. G01j 3/30
[50] Field of Search .......................................... 250/214, 218, 205, 220 R, 220 SD, 43.5 R; 356/81, 82, 87

[56] References Cited
UNITED STATES PATENTS

| | | | |
|---|---|---|---|
| 2,811,891 | 11/1957 | Roddy, Jr. | 356/87 X |
| 3,074,309 | 1/1963 | Exley | 356/87 X |
| 3,243,593 | 3/1966 | Starr et al. | 250/207 X |
| 3,401,591 | 9/1968 | Anthon | 250/218 X |
| 3,428,401 | 2/1969 | Buzza | 356/87 X |
| 3,435,239 | 3/1969 | Stalberg | 250/220 SD |
| 2,589,414 | 3/1952 | Martin | 356/205 |

Primary Examiner—James W. Lawrence
Assistant Examiner—D. C. Nelms
Attorney—Craig, Antonelli, Stewart & Hill ABSTRACT: A system for analyzing the photometric properties of a sample of material, which comprises a means for projecting a light beam from a light source to a flame into which the sample to be analyzed and a reference material are alternately introduced, a detector for detecting the intensities of the sample beam and the reference beam which have been transmitted through the flame, and a means for comparing an electric signal indicative of the intensity of said sample beam obtained from said detector with the other electric signal indicative of the intensity of said reference beam.

PATENTED NOV 16 1971

INVENTORS

KAZUO YASUDA, KOECHI UCHENO,

KOJI NISHEWAKE and HIROSHI ENOMATA

BY

Craig, Antonelli, Stewart & Hill    ATTORNEYS

3,620,628

PHOTOELECTRIC SAMPLE MEASURING APPARATUS

BACKGROUND OF THE INVENTION

1. Field of the Invention

This invention relates to a photoelectric sample measuring apparatus, and particularly to such an analyzer adaptable for an atomic absorption spectroscopic analyzer, flame photometer, spectrophotometer or the like, that employs a single beam optical system so as not to be affected by fluctuations of a light source.

2. Description of the Prior Art

It is very important in a photoelectric sample measuring apparatus such as an atomic absorption spectrometer, flame photometer or spectrophotometer to compensate for variations in the intensity of the light source, the flame and the sensitivity of the detector, which would introduce errors in the results of the test. For the purpose of such compensation, an optical system of a double beam type is commonly used in the conventional atomic absorption spectrometer. According to such an optical system, the radiation beam from a light source is divided into a pair of sequences of intermittent beams by a rotating semicircular mirror usually called a sector mirror in such a manner that the divided beams are guided alternately along two separate optical paths. One of the pair of beams is transmitted through a flame into which atomized vapor of the sample material is introduced, while the other beam is transmitted through a reference material (usually a blank). The former beam is referred to as a sample beam and the other as a reference beam. Then, both beams are led again to a common optical path and are alternately detected by a detector which converts the intensities of the beams, respectively, into electric signals. Finally, the electric signal indicative of the sample beam is compared with that of the reference beam in synchronization with the above-mentioned sector mirror. Therefore, if the variations in the light source, the sample flame and the detector sensitivity are sufficiently slow in comparison with the cyclic period of the sector mirror, the error in the test result due to such variations will be substantially cancelled. As the means for leading the sample beam and reference beam to a common optical path at the rear of the absorption stage, another sector mirror may be employed. With such a method, however, luminosity of the flame constitutes a background level of the measurement, because the sector mirror chops the sample beam and the flame light alike so that the discrimination between both by electric means is impossible. Therefore, the well known half-mirror is generally used as the means for combining the sample beam and the reference beam. In the conventional absorption spectroscope as described above, however, the utility factor for the energy of the light source is very low due to the utility losses of the light in the sector mirror as well as in the half-mirror. Accordingly, it has been often experienced that the sensitivity of detection is not sufficiently high even at its best. This problem could not be solved except by increasing the intensity of the source light. This solution introduced another problem in that the working life of the light source was extremely shortened and self-absorption of the light source was increased.

The double beam optical system is commonly used also in the spectrophotometer to eliminate the error due to the variation in a light source. In the case of the spectrophotometer, a sector mirror is used for dividing the radiation from the light source into the sample beam and the reference beam as well as for combining again both beams to a common optical path. In this case too, energy of the light source cannot be fully utilized for the measurement because of the loss of light in the sector mirrors. Further, if heating or cooling of the sample is involved in the test as is sometimes required in an infrared spectrophotometer, the sector mirror for combining both light beams is often replaced by a half-mirror, since the luminosity of the sample will adversely affect results of the test as in the absorption spectroscope. In such a case, the utility loss of the energy in the half-mirror is unavoidable.

As to the flame photometer, various attempts have been made to stabilize the flame which is the light source. Hitherto, however, no special effort has been made to eliminate the effects of minute flares which still remain in the thus stabilized flame.

SUMMARY OF THE INVENTION

An object of this invention is to provide an improved photometric sample analyzer which is free from the above-described disadvantages of the conventional devices and which is not affected by the variation in the intensity of the light source and the sensitivity of the detector.

Another object of this invention is to provide a photoelectric sample measuring apparatus having a simple structure and a high sensitivity.

In order to achieve the above objects, this invention provides a photoelectric sample measuring apparatus which comprises, in combination, an optical system of a single beam type and a means for comparing an electric signal indicative of the photometric nature of a sample material with that of a reference material. According to this invention, the sample material and the reference material are alternately and periodically introduced on to a single optical axis thereby to provide the sample beam and the reference beam correspondingly. Both beams are detected by a photoelectric transducer and are converted into corresponding electric signals. Then, the electric signal indicative of the sample material is compared with the signal indicative of the reference material in synchronization with the cycle of the above-mentioned alternate introduction of the sample and reference. Therefore, the effect of the variation in the light source to the test results is cancelled, and the loss of the light energy due to a sector mirror or a half-mirror which is inevitable in the conventional device, is eliminated.

Other objects and features of this invention will be clarified by the following description which is given with reference to the accompanying drawings.

DESCRIPTION OF THE PREFERRED EMBODIMENTS

Figure 1:
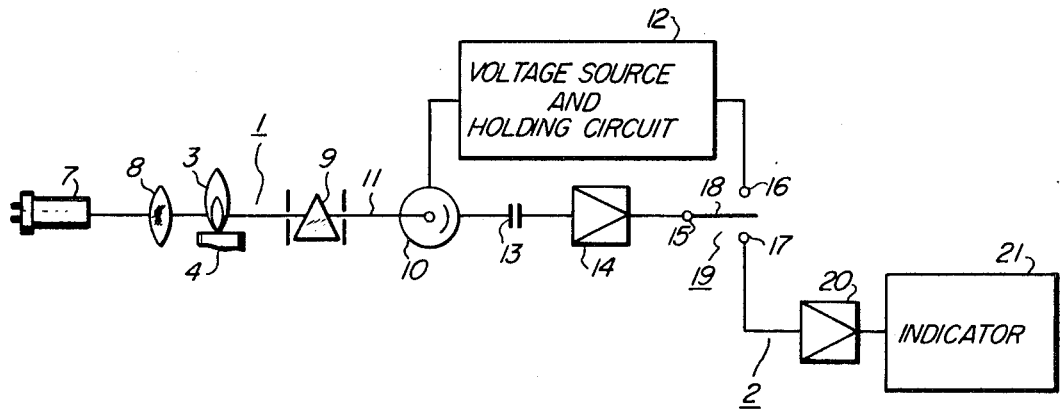
FIG. 1 is a schematic diagram illustrating an embodiment of this invention which is adapted for an atomic absorption spectroscopic analyzer.
Figure 2:
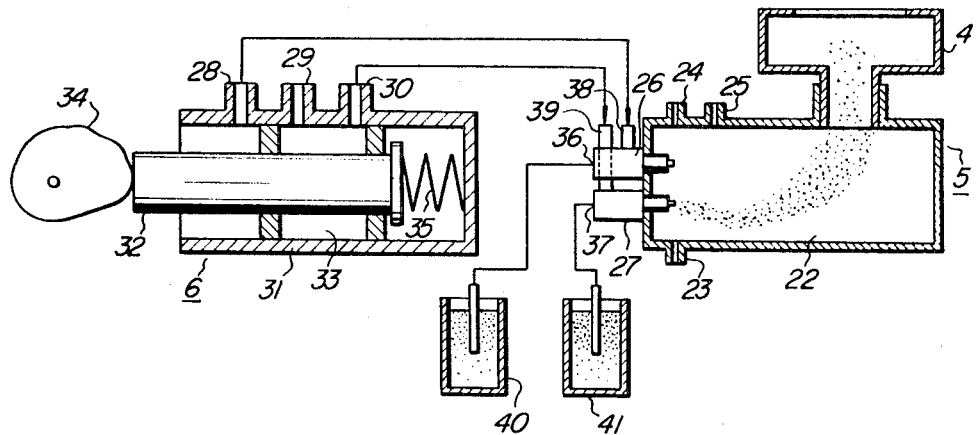
FIG. 2 is a vertical sectional view of a burner and an alternating switch valve which are used with the embodiment shown in FIG. 1.

Referring to FIGS. 1 and 2, there is shown a photoelectric sample measuring apparatus of the atomic absorption spectroscopic analyzer type, which comprises an optical system generally indicated by reference numeral 1, an electric circuitry 2, a burner 4 for providing a flame 3, a sample atomizer 5 and an alternating switch valve 6 for alternately introducing a sample material and a reference material. The optical system 1 includes a light source 7 energized from the commercial AC power supply, a condenser lens 8, a monochrometer 9, and a detector 10 which is, for example, a photomultiplier, all being aligned along an optical axis 11 in the mentioned order. A preferable type of the light source 7 is a hollow cathode tube. The flame 3 is positioned between the condenser lens 8 and the monochrometer 9. The electric circuitry 2 includes a voltage source and holding circuit 12; an amplifier 14 connected with an output terminal of the detector 10 with the intermediary of a capacitor 13; a switch 19 which has a terminal 15 connected with an output terminal of the amplifier 14, contacts 16 and 17, said contact 16 being connected with the voltage source and holding circuit 12, a movable contact 18 connected with said terminal 15 and to be transferred between said contacts 16 and 17; and an indicator, a display device or a recorder 21 connected with said contact 17 through an amplifier 20. The sample atomizer 5 is located under the burner 4 and comprises a chamber 22 which is provided with a drain 23, a combustive gas inlet 24, a combustible gas inlet 25 and two spray jets 26, 27. The alternating switch valve 6 consists of a cylinder 31 provided with a combustive gas inlet 29 and combustive gas outlets 28, 30; a plunger 32 fitted in the cylinder 31, which defines a movable space 33 between it and the cylinder 31; a cam 34 for imparting reciprocatory motion to the plunger 32; and a spring 35 for urging the plunger 32 against the cam 34. Each of the spray jets 26, 27 is provided with a sample inlet 36 or 37 and a combustive gas inlet 38 or 39. The inlets 38, 39 are connected with the outlets 28, 30 of the alternating switch valve 6, and the sample inlets 36, 37 are connected with sample containers 40, 41 in which a sample material and a reference material are contained respectively. The combustive gas inlet 29 of the valve 6 is connected with a combustive gas supply which is not shown.

The operation of the device shown in FIG. 1 will be described hereunder. The sample material to be analyzed and the reference material are alternately introduced into the flame 3 by means of the automatic device shown in FIG. 2. The light source 7 may be lighted from a suitable electric source to maintain suitable electric discharge therein, preferably with the commercial AC power or pulsed DC power. The light radiated from the light source 7 is condensed to a beam by the lens 8 and transmitted through the flame 3 where a part of the light is absorbed, the amount of the absorption depending on the density of the sample material or the reference material.

The sample beam and the reference beam are further transmitted through the monochrometer 9 and are detected by the detector 10 to be converted into the corresponding electric signals. Since the light source is fed from the AC power source, an alternating electric signal is obtained from the detector 10. Further, it will be apparent that since the sample material and the reference material are introduced into the flame alternately, electric signals obtained will consist of portions which alternately correspond to the intensities of the sample beam and the reference beam.

On the other hand while the flame 3 absorbs a part of the light from the light source 7, the flame per se produces a certain amount of light. However, this light of the flame is of a constant level and constitutes a DC component of the electric signal, which can be stopped by the capacitor 13. Therefore, an electric signal correctly indicative of the sample beam and that of the reference beam are applied to the terminal 15 of the switch 19 through the capacitor 13 and the amplifier 14. According to experiments by the present inventors, the period of a cycle of the alternate introduction of samples could be reduced to approximately 5 to 10 sec. The switching operation is performed in synchronization with the cycle of the alternate introduction of the samples into the flame in a manner that the movable contact 18 and the contact 17 make a circuit while the sample material is being introduced into the flame, and that the movable contact 18 and the contact 16 make a circuit while the reference material is being introduced. During the latter period, the electric signal indicative of the reference beam is fed back to the detector 10 through the voltage source and holding circuit 12. Thus, the voltage applied to the detector 10 controls or adjusts the operational points or the sensitivity of the detector 10 so that the output of the detector 10 assumes a predetermined value for the present reference beam input. The said voltage applied to the detector 10 is maintained by the holding circuit 12 while the succeeding electric signal indicative of the sample beam is being fed to the indicator 21 through the contacts 17, 18 and the amplifier 20. This means that the electric signal indicative of the sample beam has been compared with the electric signal indicative of the reference beam, and the indicator 21 indicates the test result which is not influenced by the variations of the intensity of the light source and the flame in the particular measurement interval.

Ordinarily, the intensity of a light source varies with time. In the case of a hollow cathode lamp which is used in the conventional atomic absorption spectroscopic analyzer, the intensity of light increases or decreases at a rate of 1 percent in 3 minutes, and the direction of the variation is reversed at an interval of about 5 to 6 hours. As described above, such variations are compensated according to this invention so that the said variations do not affect the results of the analysis. This is achieved by the fact that the sample beam is measured in comparison with the reference beam and that the period of variation in the source light is sufficiently long relative to the period of the alternate introduction of samples to the flame. The flame 3 also varies with time usually, in almost the same manner as with the light source. Further, the sensitivity of the absorbance also varies in a similar manner, sometimes. All of these variations are also compensated under the same principle as in the case of the light source.

In the conventional device, as described previously, the above-mentioned variations have been compensated usually by the use of the double beam type optical system in which a sector mirror is used for dividing the light from the source into a sample beam and a reference beam and a half-mirror is used for combining both beams again. Accordingly, the utility factor for the energy of the light source in the conventional device is only one-quarter of that in the above embodiment of this invention. That is, in the conventional device, one-half of the energy of the sample beam is lost in the sector mirror, and one-half of the remaining energy is further lost in the half-mirror. In other words, the single beam system according to this invention, in which no sector mirror nor half-mirror is employed, ensures an energy utility factor four times as high as that in the conventional double beam system.

Next, the operation of the device shown in FIG. 2 will be described. The cam 34 is rotated by a drive means (not shown) and imparts a reciprocative motion to the plunger 32 with the aid of the spring 35. The space 33 which serves as a gas passage moves with the plunger 32. Thus, when the plunger 32 is at its outermost position, the combustive gas inlet 29 communicates with the outlet 28 through the space 33. While, when the plunger 32 is at its innermost position, the inlet 29 communicates with the other outlet 30. Accordingly, combustive gas introduced through the inlet 29 is supplied alternately to the jet 26 and to the jet 27 respectively through the inlets 38 and 39. When the combustive gas is introduced to the jet 26, the test material in the container 40 is thereby sucked into the jet 26 through the inlet 36 and is sprayed into the chamber 22. On the other hand, if the combustive gas is introduced to the jet 27, the reference material in the container 41 is sucked into the jet 26 through the inlet 37 to be sprayed into the chamber 22. The atomized test material or reference material is introduced into the flame 3 through the burner 4. The chamber 22 may be heated up to an appropriate temperature so as to urge the atomization of the samples. It will be needless to say that a combustive gas and a combustible gas are also introduced into the chamber 22 respectively through the inlet 24 and the inlet 25. Thus, the test material and the reference material are alternately introduced into the flame 3. The inventors of the present invention have found that the feed of the test material and the reference material through the separate channels is very effective in avoiding mutual contamination of the materials which impairs accuracy of the test results and which is unavoidable if a common channel is alternately used for feeding both materials.

Figure 3:
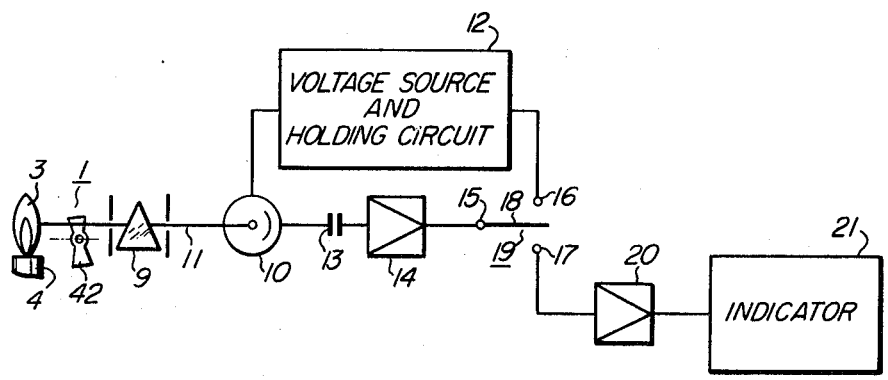
FIG. 3 is a schematic diagram showing another embodiment of this invention which is adapted for a flame photometer.

Referring to FIG. 3 which show a photoelectric sample measuring apparatus of the flame photometer type, components and systems similar to those shown in FIG. 1 are indicated by corresponding reference numerals. The only difference between the devices shown in FIG. 1 and FIG. 3 is that in the device of FIG. 3, the flame 3 per se which is made to pulsate through a chopper 42 is used for the light source, as the device is intended for determining the luminosity of the flame at a certain wavelength. Accordingly, the same principle as that for the previous embodiment (FIG. 1) is applicable to the embodiment shown in FIG. 3. Therefore, explanation of the operation of this embodiment is omitted. It will be obvious that the merits of the device of FIG. 3 are substantially the same as those of the device of FIG. 1.

Figure 4:
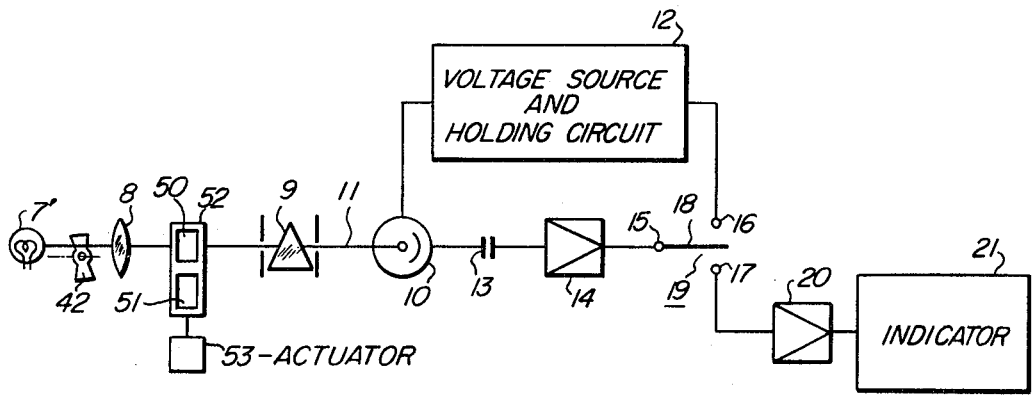
FIG. 4 is a similar diagram of still another embodiment of this invention which is adapted for a spectrophotometer.

Finally, referring to FIG. 4 which shows a photoelectric sample measuring apparatus of the spectrophotometer type, components and systems similar to those shown in FIG. 1 are indicated by corresponding reference numerals. The device shown in FIG. 4 is different from the device of FIG. 1 in the following point: the device of FIG. 4 is used for determining the absorbance of a sample contained in a sample cell, whereas the device of FIG. 1 is used to determine the absorption of light through the flame into which an atomized sample is introduced. In FIG. 4, a movable stand 52 which holds a pair of sample cells 50, 51 is placed between the condenser lens 8 and the monochrometer 9 and moved reciprocatively by a drive means or actuator 53 in a manner that the said cells 50, 51 are alternately placed on the optical axis 11. As the light source, an incandescent lamp 7' whose light is chopped by a chopper 42 is used. It will be needless to mention that one of the two cells contains the test material and the other the reference material and that the stand 52 is moved in synchronization with the switching operation of the switch 19. Further, it will be obvious that substantially the same merits as those in the first embodiment are obtained in the last embodiment.

As a number of seemingly different embodiments can be composed without deviating from the essential concept of this invention, it should be understood that all matters contained in the above description and in the drawings are shown only by way of example and do not have any limitative meaning.

We claim:

1. A photoelectric sample measuring apparatus comprising means for automatically alternately and periodically introducing a sample material and a reference material on to a single optical axis, a photoelectric transducer positioned on said optical axis for converting light beams obtained respectively from said sample material and said reference material into corresponding electric signals, and means for comparing the electric signal indicative of said sample material with the electric signal indicative of said reference material in synchronization with the operation of said means for alternately and periodically introducing materials, wherein said means for automatically alternately and periodically introducing the sample material and the reference material on to the optical axis, includes means for providing a flame on said optical axis and automatic means for alternately and periodically introducing the sample material and the reference material into said flame, wherein said automatic means for alternately and periodically introducing said materials into the flame, includes means for alternately and periodically spraying said sample material and said reference material into said flame through separate spray jets, respectively.

2. A photoelectric sample measuring apparatus as defined in claim 1, wherein said means for alternately and periodically spraying said materials, includes a cylinder having first, second and third ports, said first port communicating with one of said spray jets, said second port communicating with the other spray jet and said third port communicating with a combustive gas supply; a plunger fitted in said cylinder, a space movable with said plunger being formed between said cylinder and said plunger; and means for moving said plunger reciprocatively so that said third port communicates alternately with said first port and said second port through said space.

3. A photoelectric sample measuring apparatus as defined in claim 2, wherein said means for moving said plunger reciprocatively, includes an eccentric cam engaging against one end of said plunger, a spring for urging said plunger to said cam, and means for driving said cam.

4. A photoelectric sample measuring apparatus as defined in claim 3, wherein said means for comparing said two electric signals includes means for alternately and periodically switching said electric signal indicative of the sample material and said electric signal indicative of the reference material, respectively, to a first electric system and a second electric system, said second electric system including means for feeding back said electric signal indicative of the reference material to said photoelectric transducer to vary the sensitivity thereof in a manner that the value of said feedback signal is maintained at a constant level while the ensuing signal indicative of the sample material is being generated from said transducer, and said first electric system including means for indicating the information of the sample material as compared with the reference material.

5. A photoelectric sample measuring apparatus as defined in claim 4, wherein said electric discharge lamp is a hollow cathode lamp.

* * * * *